Dec. 12, 1972 M. L. DERTOUZOS 3,705,956

GRAPHIC DATA TABLET

Filed Jan. 25, 1971 3 Sheets-Sheet 1

INVENTOR
MICHAEL L. DERTOUZOS
BY
Morse, Altman & Oates
ATTORNEYS

INVENTOR
MICHAEL L. DERTOUZOS
BY
Morse, Altman & Oates
ATTORNEYS

Dec. 12, 1972 M. L. DERTOUZOS 3,705,956
GRAPHIC DATA TABLET
Filed Jan. 25, 1971 3 Sheets-Sheet 3

INVENTOR
MICHAEL L. DERTOUZOS
BY
Morse, Altman & Oates
ATTORNEYS

United States Patent Office 3,705,956
Patented Dec. 12, 1972

3,705,956

GRAPHIC DATA TABLET

Michael L. Dertouzos, Waban, Mass., assignor to Computek, Inc., Cambridge, Mass.

Filed Jan. 25, 1971, Ser. No. 109,205
Int. Cl. H04n 1/00
U.S. Cl. 178—18 11 Claims

ABSTRACT OF THE DISCLOSURE

An electromagnetic sensor is held in spaced relation to a grid network having a plurality of conductors defining a Gray Code pattern. Each of the conductors corresponds to a bit in the Gray Code, the grid network characterized by differences which correspond to the differences in the bits of the Gray Code. As current is passed sequentially through each of the conductors, a voltage is induced in the sensor. The location of the sensor with respect to the grid network is determined by detecting the phase of the voltage induced in the sensor.

BACKGROUND OF THE INVENTION

(1) Field of the invention

The present invention relates to graphic data tablets and more particularly to such tablets having a grid network which corresponds to a Gray Code configuration.

(2) Description of the prior art

Generally, a graphic tablet is comprised of a stylus, a grid network and associated electronics. The operator uses the stylus like a pencil to draw or trace on the surface of a tablet which is in superposition with the grid network. The associated electronics furnish a digital or analog output that is a function of the position of the stylus on the tablet. In one type of graphic data tablet, a train of pulses is applied to etched capacitive encoders placed around the circumference of the drawing surface. Each pulse is then distributed to a different set of etched conductors embedded in the surface of the tablet. This results in a distinctive pulse train on each conductor. When a stylus containing a high input impedance amplifier is moved over the etched surface, it capacitively senses the lines nearest to the stylus tip. Such graphic data tablets are unduly complex and expensive.

SUMMARY OF THE INVENTION

The invention features a graphic data tablet which is characterized by a plurality of conductors defining a grid network, an instrument having a sensor mounted thereto and associated electronics for providing output signals representative of the location of the instrument with respect to the grid network. The configuration of each of the conductors corresponds to a bit in the Gray Code and the grid network is characterized by differences which correspond to the differences in the bits of the Gray Code. As a pulsed signal is passed through each of the conductors in a programmed sequence, a current is magnetically induced in the sensor. The associated electronics generates output signals which specify the location of the instrument with respect to the grid network as a function of the phase of the voltage induced in the sensor. The combination of instrument, grid network and associated electronics is such as to provide a precise and inexpensive graphic data tablet.

The invention accordingly comprises the graphic data tablet possessing the construction and combination of elements, and arrangements of parts that are exemplified in the following detailed disclosure, the scope of which will be indicated in the appended claims.

BRIEF DESCRIPTION OF THE DRAWINGS

For a fuller understanding of the nature and objects of the present invention reference should be had to the following detailed description, taken in conjunction with the accompanying drawings wherein.

DETAILED DESCRIPTION OF THE PREFERRED EMBODIMENT

Figures 1, 2:
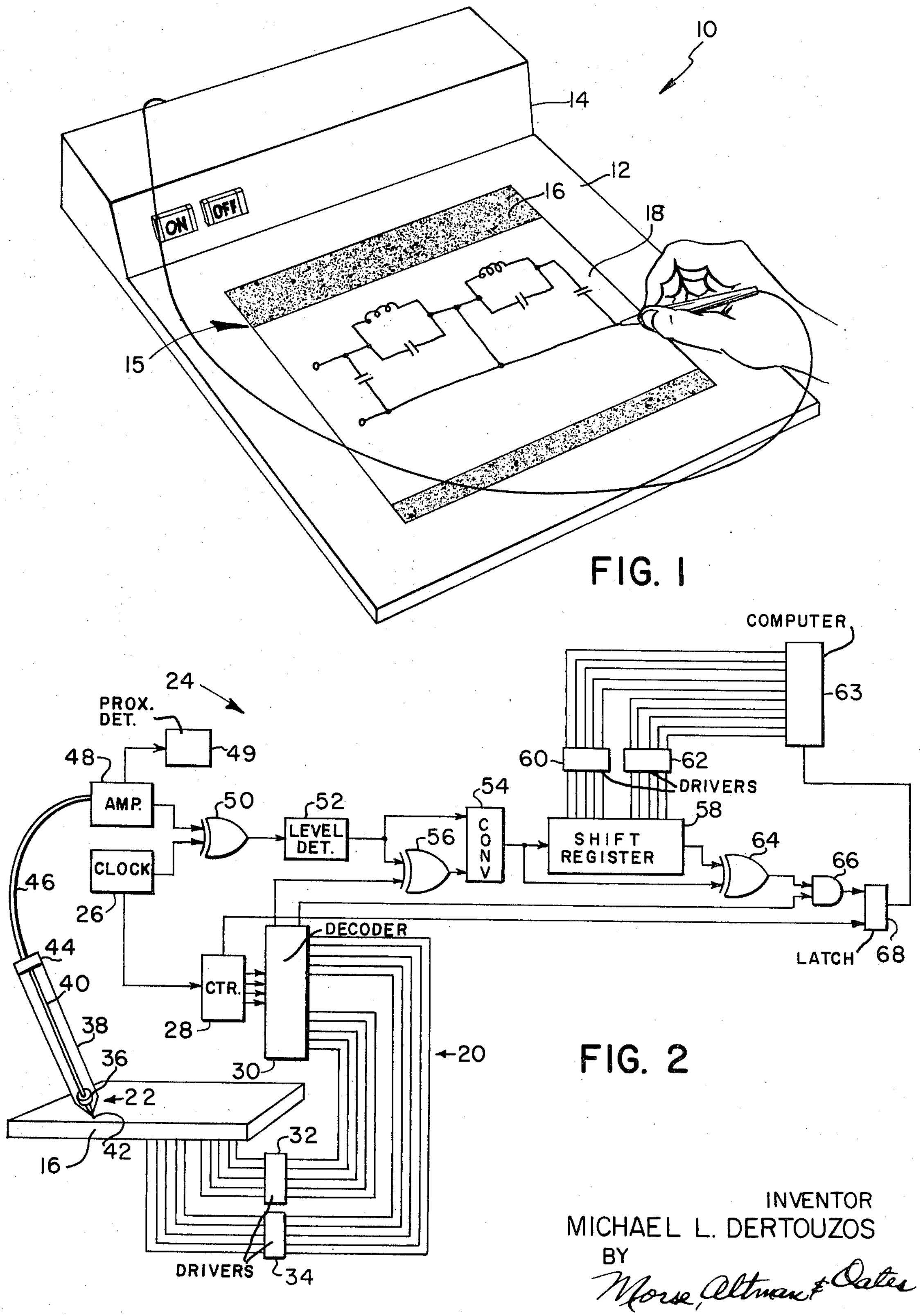
FIG. 1 is a perspective of a graphic data tablet embodying the invention.
FIG. 2 is a block and schematic diagram of the graphic data tablet of FIG. 1.

Referring now to FIG. 1 of the accompanying drawings, the reference numeral 10 generally denotes a graphic data tablet which includes a housing 12 of substantially rectangular profile having an enclosure 14 mounted thereto at one end thereof. Housing 12 is provided with a substantially rectangular opening 15 adapted for reception of a grid network 16 and a recording stratum 18. Grid network 16 is affixed to housing 12 and recording stratum 18 is removable seated on grid network 16, recording stratum 18 being substantially coplanar with the upper surface of housing 12.

The electronic circuitry associated with graphic data tablet 10, generally shown in FIG. 2, is comprised of a signal generating circuit 20, a signal sensing circuit 22 and a position detecting circuit 24.

In signal generating circuit 20, the signals as at the output of a clock 26 are applied to the input of the counter 28, whereby a series of timing pulses are presented at the output of the counter 28. The series of timing pulses are applied to a decoder 30, the signal as at the output of decoder 30 being a sequence of driving pulses. The driving pulses are applied to grid network 16 via line drivers 32 and 34.

As hereinafter described in connection with the description of FIG. 5, grid network 16 is comprised of a plurality of conductors, the configuration of each of the conductors corresponding to a bit in the Gray Code, grid network 16 being characterized by differences that correspond in the bits of the Gray Code. In the preferred embodiment of the invention, the plurality of conductors are arranged in an X and a Y plane. Line drivers 32 and 34 are connected to the conductors of the X and Y plane, respectively.

In one form of the invention, sensing circuit 22 is a coil 36 mounted to an instrument 38, for example a stylus. In the preferred embodiment of the invention, stylus 38 includes a cartridge 40 adapted for reception of a marking medium 42, for example lead, and slidably mounted to stylus 38. A microswitch 44 is affixed to stylus 38 in such a manner that the contacts of microswitch 44 are closed when lead 42 bears against stratum 18. In consequence of the signals as at the output of line drivers 32 and 34 being applied sequentially to grid network 16, a voltage is induced in coil 36. The signals as at the output of coil 36 are applied to an amplifier 48 of position detecting circuit 24 via a conductor 46. Preferably, conductor 46 is a shielded cable. A signal from amplifier 48 is applied to a proximity detector 49 which generates a signal representing the distance between coil 36 and grid network 16.

The signal as at the output of amplifier 48 and the timing signal as at the output of clock 26 are applied to an exclusive OR gate 50. In one example, the signal as at the output of exclusive OR gate 50 is zero volts when the signal as at the output of coil 36 is in phase and the signal as at the output of exclusive OR gate 50 is 5 volts when the signal as at the output of coil 36 is out of phase. The signal as at the output of exclusive OR gate 50 is applied to a level detector 52, the signal as at the output of level detector 52 being specified by the phase of the signal as at the output of coil 36. The signal as at the output of level detector 52, i.e. logic signals in a Gray Code pattern, are applied to a Gray Code to a binary code converter 54 which is enabled by a signal as at the output of an exclusive OR gate 56. An end of cycle pulse from decoder 30 and the Gray Code signals as at the output of level detector 52 are applied to the inputs of exclusive OR gate 56. The binary coded signal as at the output of converter 54 are applied to a shift register 58. The signals as at the output of shift register 58 are applied to line drivers 60 and 62, the signals as at the output of line drivers 60 and 62 representing the position of stylus 38 with respect to a point on grid network 16. The signals as at the output of line drivers 60 and 62 may be applied to a computer 63 or a display (not shown). The binary coded signals as at the output of converter 54 and a coded signal representing the last bit of shift register 58 are applied to an exclusive OR gate 64. The signal as at the output of exclusive OR gate 64 and a clock pulse from decoder 30 are applied to an AND gate 66 which inputs a latch 68. A counting pulse as at the output of counter 28 is applied also to latch 68, the signal as at the output of latch 68 indicating whether the position of stylus 38 with respect to grid network 16 has changed. The signal as at the output of latch 68 is applied to computer 63.

Figure 3:
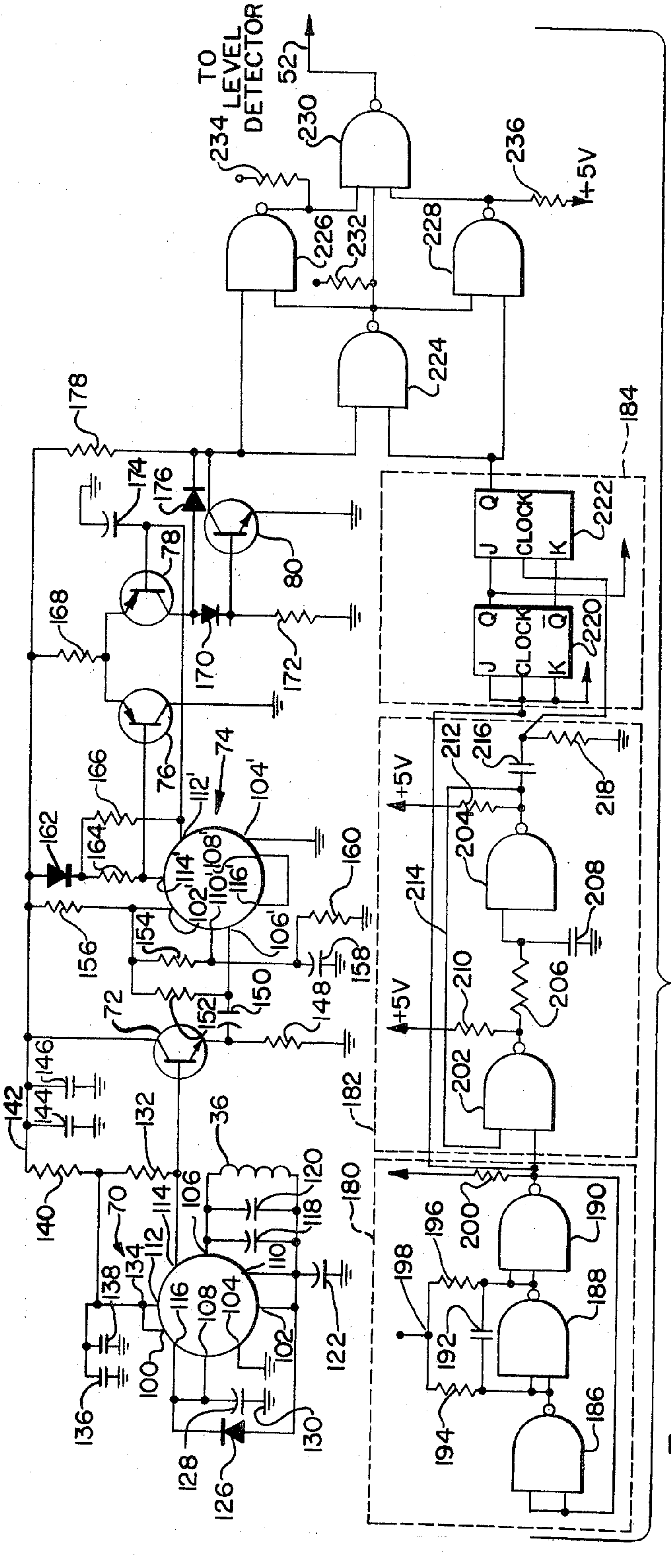
FIG. 3 is a schematic diagram showing parts of the circuitry of FIG. 2 in detail.
Figure 4:
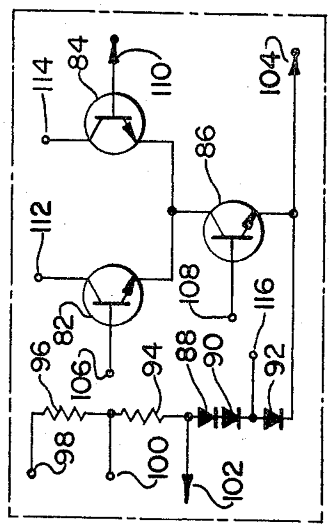
FIG. 4 is a schematic diagram showing parts of the circuitry of FIG. 3 in detail.

Referring now to the schematic diagram of FIGS. 3, it will be seen that amplifier 48 includes a differential amplifier 70, an emitter follower 72, a differential amplifier 74, an amplifier 76, a level set 78 and an amplifier 80. The details of differential amplifiers 70 and 74 are shown in FIG. 4.

Each of differential amplifiers 70 and 74 includes transistors 82, 84 and 86, diodes 88, 90, and 92, and resistors 94 and 96. The emitters of transistors 82 and 84 are connected to the collector of transistor 86 and the emitter of transistor 86 is connected to the cathode of diode 92. The anode of diode 92 is connected to the cathode of diode 90 and the anode of diode 90 is connected to the cathode of diode 94. The anode of diode 88 is connected to one side of resistor 94, the other side of resistor 94 is connected to one side of resistor 96. The other side of resistor 96 and the conjunction of resistors 94 and 96 are designated terminals 98 and 100, respectively. The conjunction of resistor 94 and diode 88 is designated as terminal 102 and the conjunction of the emitter of transistor 86 and the cathode of diode 92 is designated as terminal 104. The base of transistors 82, 86 and 84 are designated as terminals 106, 108 and 110 respectively. Reference numerals 112 and 114 designate the collectors of transistors 82 and 84, respectively. A terminal 116 defines the conjunction of the cathode of diode 90 and the anode of diode 92.

As shown in FIG. 3, capacitors 118 and 120 are connected in parallel with coil 36, one side of each capacitor 118, 120 and coil 36 is connected to terminal 106 and the other side of each capacitor 118 and 120 and coil 36 is connected to terminal 110. A capacitor 122 is connected between terminal 110 and ground. Terminal 110 is jumpered to terminal 102 and is connected to the anode of a diode 126. The cathode of diode 126 is connected to terminals 116 and 108. A capacitor 128 is connected serially between the common conjunction of terminals 108, 116 and ground. A resistor 132 is connected serially between a common conjunction 134 of terminals 100, 112 and terminal 114. One side of each of capacitors 136 and 138 is connected to conjunction 134, the other side of each of capacitors 136 and 138 is connected to ground, capacitors 136 and 138 being connected in parallel to each other. One side of a resistor 140 is connected to conjunction 134, the other side of resistor 140 is connected to a bus line 142. A voltage, for example 5 volts is applied to bus line 142. One side of a capacitor 144 and one side of a capacitor 146 are connected to bus line 142, the other side of each of capacitors 144 and 146 is connected to ground. The collector of emitter follower 72 is connected to bus line 142 and the base of emitter follower 72 is connected to terminal 114. The emitter of emitter follower 72 is connected to ground through a resistor 148, the conjunction of resistor 148 and the emitter of emitter follower 72 is connected to differential amplifier 74 through a capacitor 150.

The terminals of differential amplifier 74 which correspond to like terminals of differential amplifier 70 will be designated by primed reference numerals. One side of capacitor 150 is connected to the emitter follower 72 and the other side of capacitor 150 is connected to terminal 106'. A resistor 152 is connected serially between terminal 102' and terminal 106' and a resistor 154 is connected serially between terminals 102' and 110'. A resistor 156 is connected serially between bus line 142 and terminal 102'. A capacitor 158 is connected serially between terminal 110' and ground and a resistor 160 is connected serially between terminal 110' and ground. Terminal 104' is grounded and terminal 108' is jumpered to terminal 116'. A diode 162 and a resistor 164 are connected in series between bus line 142 and terminal 114', the anode of diode 162 being connected to bus line 142 and one side of resistor 164 being connected to terminal 114'. The conjunction of diode 162 and resistor 164 is connected to terminal 112' through a resistor 166. Terminal 114' is connected to the base of amplifier 76.

The emitters of amplifier 76 and level set 78 are connected to bus line 142 through a resistor 168. The collector of amplifier 76 is grounded and the collector of level set 78 is connected to ground through a diode 170 and a resistor 172. The base of level set 78 is connected to terminal 112' and to ground through a capacitor 174. The collector of level set 78 is connected to the collector of amplifier 80 through a diode 176, the anode of diode 176 being at the collector of level set 78. The base of amplifier 80 is connected to the conjunction of diode 170 and resistor 172, and the emitter of amplifier 80 is grounded. The collector of amplifier 80 is connected to bus line 142 through a resistor 178.

Clock 26 includes a clock 180, a delay 182 and a clock 184. Clock 180 includes NAND gates 186, 188 and 190, a capacitor 192, and resistors 194 and 196. The signal as at the output of NAND gate 186 is applied to the input of NAND gate 188, the signal as at the output of NAND gate 188 is applied to the input of NAND gate 190. Capacitor 192 is connected serially between the input and output of NAND gate 188. One side of capacitor 192 is connected to one side of resistor 194, the other side of capacitor 192 is connected to one side of resistor 196. The other side of each of resistors 194 and 196 are joined at a conjunction 198, a positive voltage is applied at conjunction 198. A positive voltage is applied also at the output of NAND gate 190 and the input of NAND gate 186 through a resistor 200. The signal as at the output of NAND gate 190 is applied to delay 182 and clock 184.

Delay 182 includes NAND gates 202 and 204, resistors 206, 210, 212 and 218, and capacitors 208 and 216. The output of NAND gate 202 is connected to the input of NAND gate 204 through resistor 206. Capacitor 208 is connected serially between the conjunction of resistor 206 and the input of NAND gate 204, and ground. A positive voltage is applied at the outputs of NAND gates 202 and 204 through resistors 210 and 212, respectively. The output of NAND gate 204 is connected to one of the inputs of NAND gate 202 via a line 214. The output of NAND gate 204 is connected to ground via serially connected capacitor 216 and resistor 218.

Clock 184 includes flip-flops 220 and 222. The J and K inputs of flip-flops 220 are connected to a positive voltage and the clock input of flip-flop 220 is connected to the output of NAND gate 190. The Q output of flip-flop 220 is connected to the J input of flip-flop 222 and the $\overline{Q}$ output of flip-flop 220 is connected to the K input of flip-flop 222. The clock input of flip-flop 222 is connected to the conjunction of capacitor 216 and resistor 218. The Q output of flip-flop 220 is connected to counter 28. The Q output of flip-flop 222 is applied to exclusive OR gate 50. In one example, the signal as at each of the Q outputs of flip-flops 220 and 222 is 500 kHz., the signal as at the Q output of flip-flop 222 being delayed from the signal as at the Q output of flip-flop 220.

Exclusive OR gate 50 includes NAND gates 224, 226, 228 and 230. The collector of amplifier 80 is connected to the first input of each of NAND gates 224 and 226. The Q output of flip-flop 222 is connected to the second input of each of NAND gates 222 and 228. The second input of NAND gate 226 is connected to the first input of NAND gate 228 and the output of NAND gate 224. A positive voltage is applied to the output of NAND gate 224 through a resistor 232. The outputs of NAND gates 226 and 228 are connected to the first and second inputs, respectively, of NAND gate 230. A positive voltage is applied to the outputs of NAND gates 226 and 228 through resistors 234 and 236, respectively. The output of NAND gate 230 is connected to the input of level detector 52.

Figure 5:
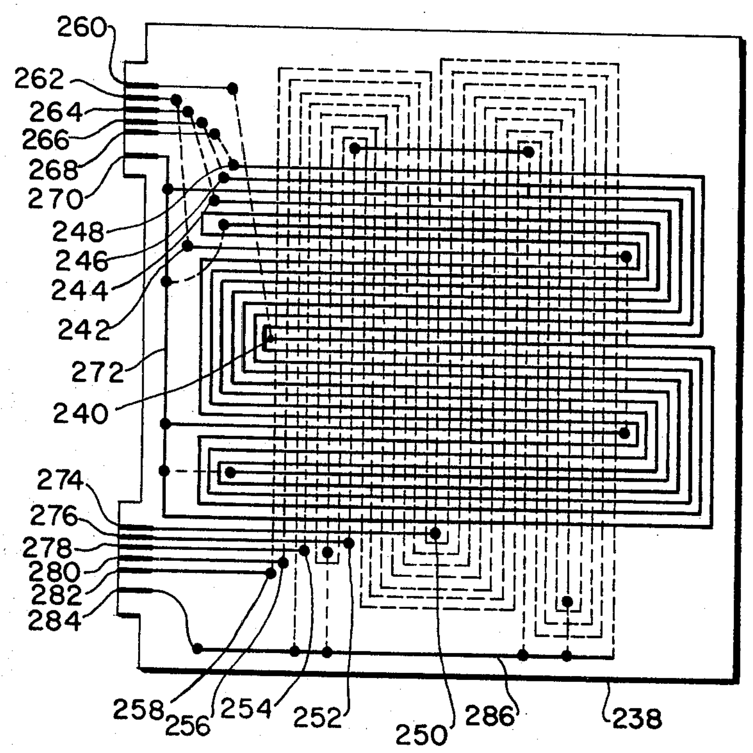
FIG. 5 is a top elevation of a grid network having a grid network in a Gray Code configuration in accordance with the invention.

Referring now to FIG. 5 by way of example, grid network 16 is shown as an XY coordinate tablet 238, for example a printed circuit board, having a plurality of conductors 240, 242, 244, 246, 248, 250, 252, 254, 256 and 258. In one example, the conductors shown in solid lines are mounted on the upper surface of printed circuit board 238 and the conductors shown in dashed lines are mounted on the lower surface of the printed circuit board, the solid lines defining a plane which is in superposition with a plane defined by the dashed lines. Conductors 240, 242, 244, 246 and 248 represent the X coordinates and conductors 250, 252, 254, 256 and 258 represent the Y coordinates. Conductors 240, 242, 244, 246 and 248 are insulated electrically from conductors 250, 252, 254, 256 and 258. One end of each of conductors 240, 242, 244, 246 and 248 is connected to terminals 260, 262, 264, 266 and 268, respectively. The other end of each conductor 240, 242, 246 and 248 is connected to a common terminal 270 via a bus line 272. One end of each of conductors 250, 252, 254, 256 and 258 is connected to terminals 274, 276, 278, 280 and 282, respectively. The other end of conductors 250, 252, 254, 256 and 258 is connected to a common terminal 284 via a bus line 286. The path defined by each of the conductors is shown in FIG. 6.

Figures 6, 7:
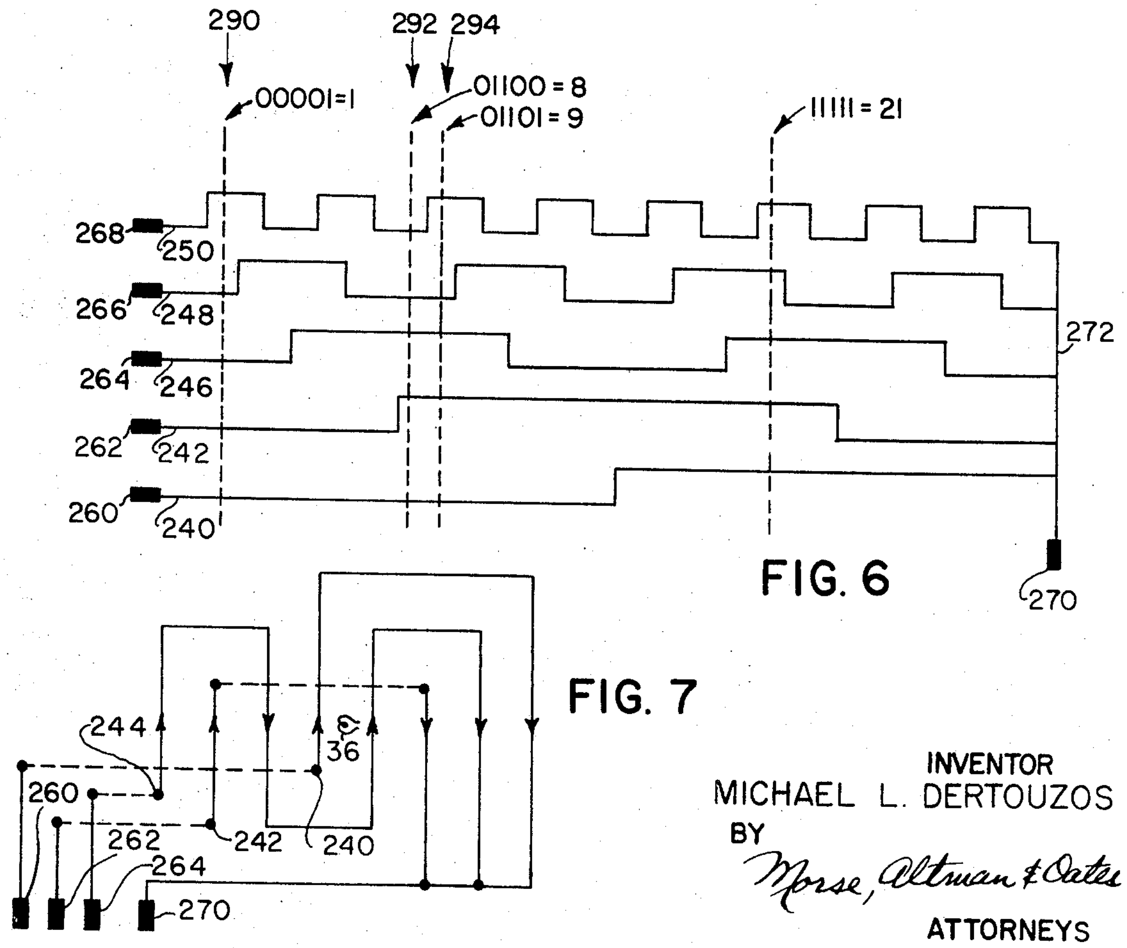
FIG. 6 is a Gray Code pattern illustrating certain principles of the invention.
FIG. 7 is a schematic diagram illustrating certain principles of the invention.

The path defined by each of the conductors corresponds to a bit in the Gray Code, the configuration of each axis of grid network 16 corresponding to the Gray Code pattern illustrated in FIG. 6. It will be appreciated that, if the Gray Code pattern shown in FIG. 6 was compressed into the grid network shown in FIG. 5, the conductors would cross at a number of points. In order to minimize the number of conductor crossings, the path defined by each of the conductors is slightly different from the Gray Code pattern illustrated in FIG. 6. By tracing each of the conductor paths shown in FIG. 5, it will be seen that the path of each conductor corresponds to the Gray Code pattern of FIG. 6. In order to facilitate an understanding of the relationship between the conductor paths of FIG. 5 and the Gray Code pattern of FIG. 6, the reference numerals denoting the X coordinate conductors of grid network 16 are applied to the correlative Gray Code bit shown in the Gray Code pattern of FIG. 6.

Referring now to FIG. 7, in order to facilitate an understanding of the invention, there is shown an exploded view of conductors 240, 242 and 244. The signals as the output of line driver 32 are applied sequentially to terminals 260, 266 and 264 in consequence conductors 240, 242 and 244 are energized sequentially. As current passes coil 36, a voltage is induced therein, the phase of the induced voltage being a function of the direction of current flow. Initially, conductor 260 is energized, in consequence as in phase voltage is induced in coil 36 as the current passes thereby. Secondly, a signal is applied to conductor 242 via terminal 262, whereby an out of phase voltage is induced in coil 36 as the current passes thereby. Thirdly, a signal is applied to conductor 244 via terminal 264, in consequence as in phase voltage is induced in coil 36 as the current passes thereby. By detecting the in phase and out of phase induced voltage as different logic level signals, the position of sensor 36 with respect to grid network is specified. For example, a logical ZERO is presented at the output of exclusive OR gate 50 when the induced voltage is in phase and a logical ONE is presented at the output of exclusive OR gate 50 when the induced voltage is out of phase. The logical ONES and ZEROS as at the output of exclusive OR gate 50 define a specific point in grid network 16, as shown in FIG. 6 at 290, 292, 294 and 296.

The logic signal as at the output of exclusive OR gate 50 is applied to exclusive OR gate 56 and Gray to Binary converter 54 via level detector 52. Exclusive OR gate 56 is enabled by a signal as at the output of decoder 30, the signal as at the output of exclusive OR gate 56 being applied to Gray to Binary converter 54. The binary coded signals as at the output of converter 54 are applied to line drivers 60 and 62 via shift register 58. Signals representing the first and last bit of each coordinate of grid network 16 as at the input and output of shift register 58 are applied to exclusive OR gate 64, in consequence the signal as at the output of OR gate 64 provides an indication as to whether the position of stylus 38 has changed during a measurement cycle. The signal as at the output of exclusive OR gate 64 and a clock pulse as at the output of decoder 30 are applied to latch 68 which is free running. Latch 68 changes state when the signal as at the output of AND gate 66 indicates that the position of stylus 38 has changed during the measurement cycle. Latch 68 is reset by an end of cycle pulse as at the output of counter 28, in consequence an output pulse which indicates initiation of a new measurement cycle is applied to the computer.

Since certain changes may be made in the foregoing disclosure without departing from the scope of the intent of the invention herein involved, it is intended that all matter be construed in an illustrative and not in a limiting sense.

What is claimed is:

1. A graphic data tablet comprising:

(a) a tablet having first and second opposite faces;

(b) at least first and second conductor means mounted to said first face of said tablet, said first conductor means disposed in a first path corresponding to a first bit in the Gray Code, said first path occupying a first area of said first face, said second conductor means disposed in a second path corresponding to a second bit in the Gray Code, said second path occupying a second area of said first face, said first and second areas being separate and distinct, said first and second conductor means being coplanar;

(c) means for sequentially passing a signal through said first and second conductor means; and sensing means electromagnetically communicating with said first and second conductor means for sensing said signal sequentially passed through said first and second means.

2. The graphic data tablet as claimed in claim 1 including at least third and fourth conductor means mounted to said second face of said tablet, said third conductor means disposed in a third path corresponding to said first bit in the Gray Code, said third path occupying a first area of said second face, said fourth conductor means disposed in a fourth path corresponding to said second bit in the Gray Code, said fourth path occupying a second area of said second face, said first and second areas of said second face being separate and distinct, said third and fourth conductor means being coplanar, said first path like said third path, said second path like said fourth path, said first and second conductor means defining X coordinates, said third and fourth conductor means defining Y coordinates, said signal being sequentially passed through said third and fourth conductor means and sensed by said sensing means.

3. The graphic data tablet as claimed in claim 2 wherein said sensing means is in the form of a stylus, an electromagnetic sensor mounted at a working end of said stylus, the phase of the sensed signal defining a point in said tablet.

4. The graphic data tablet as claimed in claim 3 including a stratum in superposition with said tablet.

5. A graphic data tablet comprising:

(a) at least two conductor means defining a grid network, the path of one of said conductor means corresponding to a first bit in the Gray Code, the path of the other of said conductor means corresponding to a second bit in the Gray Code, said grid network characterized by differences which correspond to the differences in the bits of the Gray Code, the one of said conductor means being coplaner with the other of said conductor means;

(b) means electrically connected to said conductor means for generating a pulsed signal, said pulsed signal being applied sequentially to said conductor means;

(c) means electro-magnetically communicating with said grid network for sensing said pulsed signal, said pulsed signal being induced in said sensing means; and (d) means electro-magnetically communicating to said sensing means for detecting the phase of said induced signal, said detected phase defining a point in said grid network.

6. The graphic data tablet as claimed in claim 5 wherein said generating means includes:

(a) a clock for generating a sequence of timing pulses;

(b) a counter electrically connected to said clock for providing output pulses as a function of said timing pulses;

(c) means electrically connected to said counter for decoding said counter output pulses; and (d) driving means electrically connected to said decoding means and each of said conductor means, the signals as at the output of said decoding means being applied sequentially to each of said driving means, said conductor means being energized sequentially by the signals as at the output of said driving means.

7. The graphic data tablet as claimed in claim 5 wherein said sensing means is an electromagnetic sensor.

8. The graphic data tablet as claimed in claim 5 wherein said detecting means includes:

(a) a clock for generating a sequence of timing pulses;

(b) signal means electrically connected to said sensing means for providing an output signals responsive to the phase of said sensed signals;

(c) a comparator electrically connected to said clock and signal means for providing logic signals representative of the phase of said sensed signal, said logic signals being in the Gray Code;

(d) means electrically connected to said comparator means for converting said Gray Code logic signals to binary coded signals; and (e) shift register means electrically connected to said converting means for storing said binary coded signals as at the output of said converting means, the signals as at the output of said shift register means defining a point in said grid network.

9. A graphic data tablet comprising:

(a) at least two conductor means defining a grid network, the path of one of said conductor means corresponding to a first bit in the Gray Code, the path of the other of said conductor means corresponding to a second bit in the Gray Code, said grid network characterized by differences which correspond to the differences in the bits of the Gray Code, the one of said conductor means being coplanar with the other of said conductor means;

(b) clock means for providing a sequence of timing pulses;

(c) a counter electrically connected to said clock means for providing output pulses as a function of said timing pulses;

(d) means electrically connected to said counter means for decoding said pulses as at the output of said counter;

(e) driving means electrically connected to said decoding means and each of said conductor means, the signals as at the output of said decoding means being applied sequentially to each of said driving means, said conductor means being energized sequentially by the signals as at the output of said driving means, (f) means electrically connected to said clock means for delaying the timing signals as at the output of said clock means;

(g) means electrically communicating with said grid network for sensing said signals applied to said conductor means, said signals applied to said conductor means being induced in said sensor means;

(h) signal means electrically connected to said sensing means for providing output signals responsive to the phase of said sensed signals;

(i) means electrically connected to said signal means and delay means for comparing the signals as at the output of said signal means with the timing signals as at the output of said delay means, said comparing means generating logic signals representative of the phase of said induced signals, said logic signals being in the Gray Code;

(j) means electrically connected to said comparator means and logically connected to said decoding means for converting said Gray Code logic signals to binary coded signals; and (k) shift register means electrically connected to said converting means for storing said binary coded signals as at the output of said converting means, the signals as at the output of said shift register means defining a point in said grid network.

10. The graphic data tablet as claimed in claim 9 including:

(a) exclusive OR means having at least a first and a second input, the input of said shift register means being electrically connected to said first input of said exclusive OR means and the output of said shift register means being electrically connected to said second input of said exclusive OR means;

(b) AND gate means having at least a first and a second input, the output of said exclusive OR means being electrically connected to the first input of said AND gate means and the second input of said AND gate means being electrically connected to said decoding means; and (c) latch means having at least a first and a second input, the output of said AND gate being electrically connected to the first input of said latch means and the second input of said latch means being electrically connected to said counter means, the signal as at the output of said latch means denoting a change in the position of said sensing means with respect to said grid network.

11. The graphic data tablet as claimed in claim 9 including:

(a) a stratum mounted in superposition with said grid network;

(b) an electromagnetic sensor, said sensor means being in the form of a stylus, said electromagnetic sensor mounted to said stylus at a working end thereof;

(c) a cartridge slidably received within said stylus;

(d) a marking medium received within said cartridge, a portion of said marking medium extending from the working end of said stylus, said marking medium adapted for engaging and marking said stratum; and (e) switch means having energized and deenergized states, said switch means mounted to said stylus and adapted for engagement and disengagement with said cartridge, said switch means engaged by said cartridge when said marking means and stratum are in engagement, said switch means being in the energized state when engaged by said cartridge, said sensed signal induced in said sensor means being applied to said signal means via said switch means when said switch means is in the energized state.

References Cited

UNITED STATES PATENTS

| | | | |
|---|---|---|---|
| 3,588,345 | 6/1971 | Dym | 178—18 |
| 3,440,643 | 4/1969 | Teager | 178—18 |
| 3,567,859 | 3/1971 | Ellis et al. | 178—18 |
| 3,466,646 | 9/1969 | Lewin | 178—18 |
| 3,342,935 | 9/1967 | Leifer et al. | 178—19 |
| 3,591,718 | 7/1971 | Asano et al. | 178—19 |

KATHLEEN H. CLAFFY, Primary Examiner

H. F. BRAUNER, Assistant Examiner

U.S. Cl. X.R.

340—347 AD, 146.3 SY